United States Patent [19]

Smith

[11] Patent Number: 4,564,167
[45] Date of Patent: Jan. 14, 1986

[54] TOOL BOX MOUNTING ASSEMBLY

[76] Inventor: James H. Smith, P.O. Box 144, Glenn, Calif. 95943

[21] Appl. No.: 547,205

[22] Filed: Oct. 31, 1983

[51] Int. Cl.[4] ............................................. F16M 13/00
[52] U.S. Cl. ................................ 248/552; 224/42.45 R
[58] Field of Search ............ 248/551, 552, 553, 289.1; 180/68.5; 296/37.6; 224/42.39, 42.4, 42.38, 42.45 R, 282

[56] References Cited

U.S. PATENT DOCUMENTS

| | | | |
|---|---|---|---|
| 1,138,122 | 5/1915 | Lambert et al. | 180/68.5 |
| 1,453,997 | 5/1923 | Rivet | 248/289.1 |
| 1,722,402 | 7/1929 | Veilleux | 248/289.1 X |
| 3,199,824 | 8/1965 | Chapps | 248/551 X |
| 3,350,856 | 11/1967 | Revell | 248/289.1 X |
| 4,085,961 | 4/1978 | Brown | 224/282 X |
| 4,136,904 | 1/1979 | Lauderdale | 224/42.42 R X |
| 4,191,034 | 3/1980 | Froess | 180/68.5 X |
| 4,266,821 | 5/1981 | Gillet | 296/37.6 |
| 4,378,127 | 3/1983 | Rossi | 296/37.6 X |
| 4,469,364 | 9/1984 | Zadeh | 296/37.6 |

Primary Examiner—J. Franklin Foss
Attorney, Agent, or Firm—Robert Charles Hill

[57] ABSTRACT

A mounting assembly is disclosed for mounting a container such as a tool box or the like on a structural element such as a portion of a vehicle. The mounting assembly includes a bracket adapted for attachment to the structural element, a frame for supporting the container or tool box being pivotably attached to the bracket by a pin, the pin being removable for permitting movement of the container and/or the frame away from the bracket, and a locater lever which is selectively movable into engagement between the pivotable frame and bracket for fixing or securing the container in at least one operating position.

9 Claims, 3 Drawing Figures

TOOL BOX MOUNTING ASSEMBLY

BACKGROUND OF THE INVENTION

The present invention relates to a mounting assembly for mounting a container on a structural element and more particularly to such an assembly for mounting a tool box or the like on a structural element, preferably a portion of a vehicle.

Numerous assemblies or constructions have been provided in the prior art for mounting containers such as tool boxes or work boxes on various structural elements such as portions of vehicles or the like. Most commonly, such assemblies rigidly attach the container to the structural element to assure that it remains in place thereupon.

Other prior art assemblies have provided for at least limited movement of the container relative to the structural element. For example, U.S. Pat. No. 2,941,706 issued June 21, 1960 to G. A. Slater and U.S. Pat. No. 4,221,311 issued Sept. 9, 1980 to Silas Penn related to carrier structures which were pivotably mounted on vehicles for carrying luggage and the like. In addition, U.S. Pat. No. 1,284,979 issued Nov. 19, 1918 disclosed a work box which was movably attached to a work table in a manner permitting the work box to be moved from a storage position beneath the table to an exposed position where its contents are accessible.

However, there has been found to remain a need for a mounting assembly for containers such as tool boxes wherein the mounting assembly will further facilitate use of the tool box.

SUMMARY OF THE INVENTION

It is therefore an object of the invention to provide a mounting assembly for containers such as tool boxes or the like.

It is a further object of the invention to provide such a mounting assembly which is further adapted for maintaining the container either in a storage condition or in an exposed condition to make the container more accessible.

Additional objects and advantages of the invention are made apparent in the following description having reference to the accompanying drawings.

DESCRIPTION OF THE PREFERRED EMBODIMENT

Figure 2:
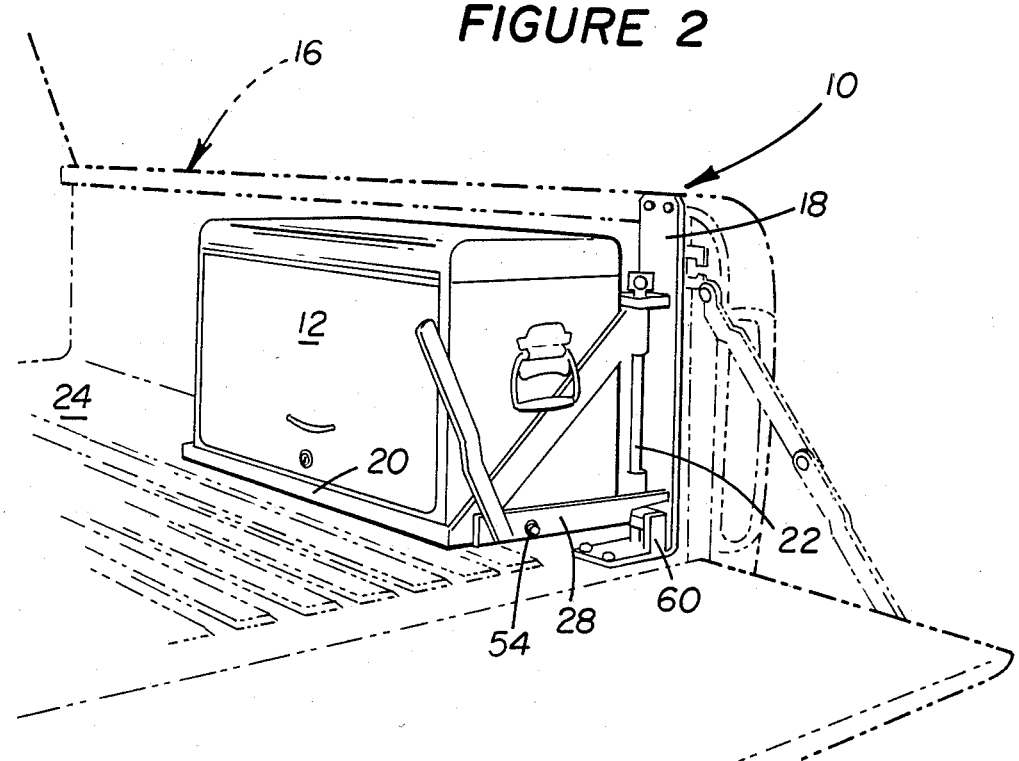
FIG. 2 is a view of the mounting assembly attached to a structural portion of a vehicle, a container being mounted on the assembly and moved into a storage position in the vehicle.
Figure 3:
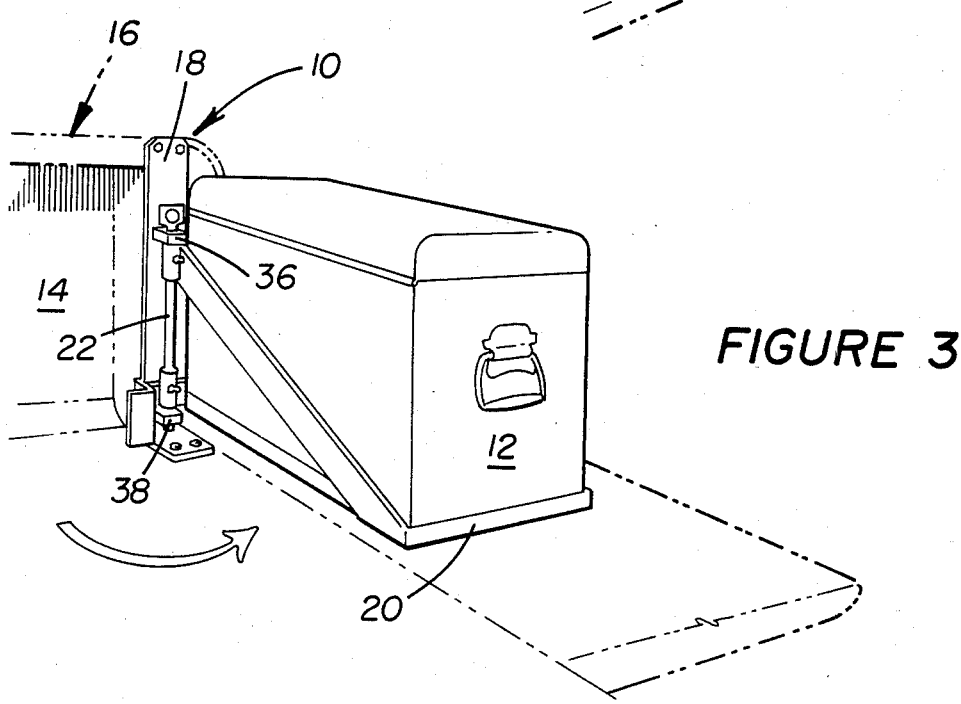
FIG. 3 is a view similar to FIG. 2 with the container or tool box pivoted outwardly on a portion of the mounting assembly to facilitate access to the contents of the tool box as well as to permit full access to the bed of the vehicle.

Referring now to the drawings and particularly to FIGS. 2 and 3, the present invention is directed toward a mounting assembly of the type generally indicated at 10 for mounting containers such as a tool box 12 on a structural portion 14 of a vehicle such as a truck, partially illustrated at 16.

Figure 1:
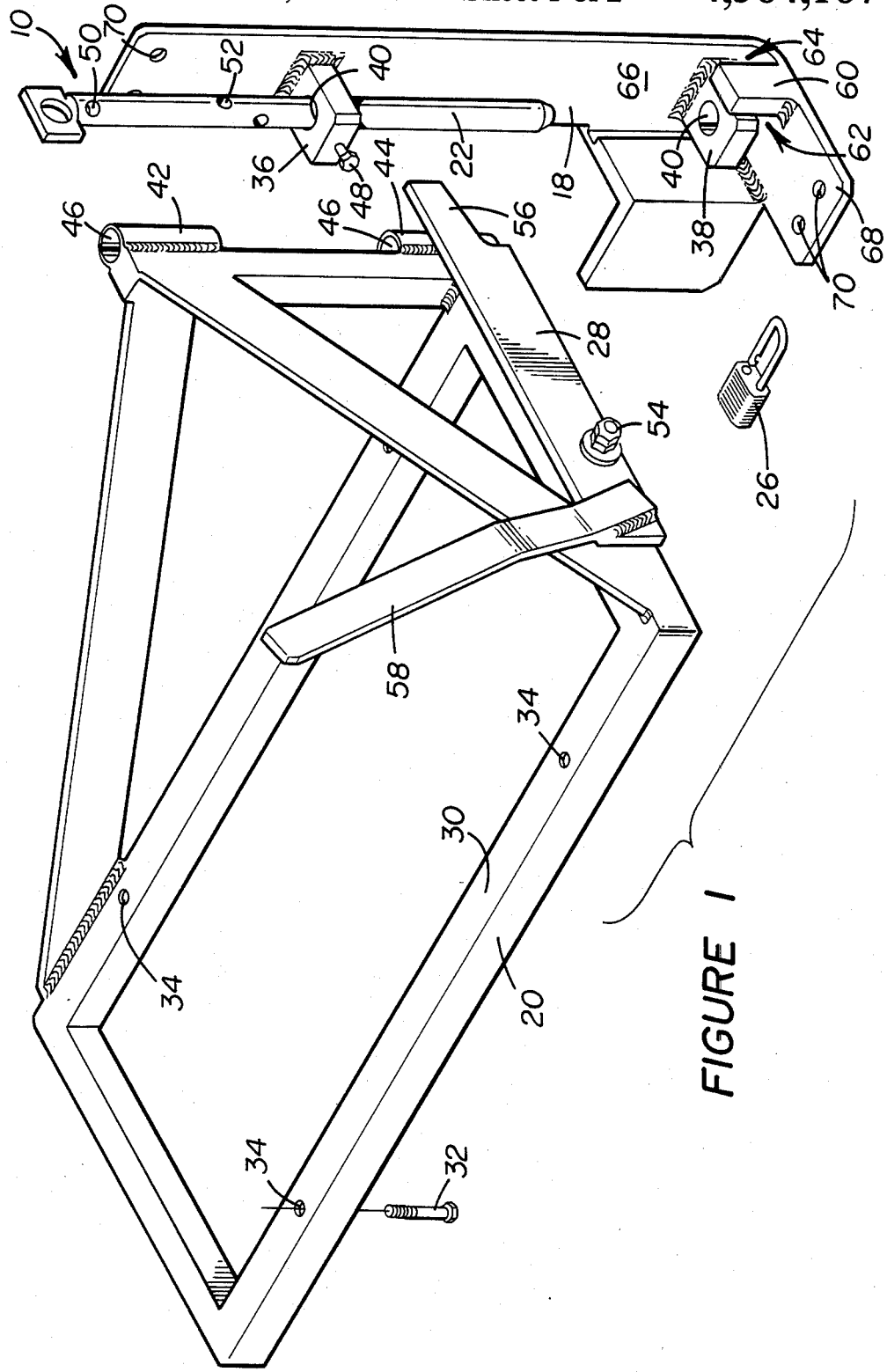
FIG. 1 is an exploded view of the components of a mounting assembly constructed according to the present invention.

Referring also to FIG. 1, the mounting assembly 10 includes a fabricated bracket 18 adapted for attachment to the structural portion 14 of the truck. A fabricated frame 20 is pivotably mounted upon the bracket 18 by means of a pin 22 so that the tool box 12 and frame 20 may be moved either to a storage position within the bed of the truck as illustrated in FIG. 2 or an exposed position illustrated in FIG. 3 for facilitating access to the tool box. In addition, with the tool box being moved into the position illustrated in FIG. 3, the full bed 24 of the truck is also accessible.

In addition to permitting pivotal movement of the tool box between the positions illustrated in FIGS. 2 and 3, the mounting assembly 10 also permits portable use of the tool box 12 along with the mounting frame 20 merely by removal of the pin 22. However, removal of the tool box 12 from the vehicle, except by the owner, may be readily prevented by means of a lock 26 adapted for securing the pin 22 in place. Furthermore, the mounting assembly 10 is also provided with a lever 28 for locating or fixing the tool box 12 either in the position illustrated in FIG. 2 or the position illustrated in FIG. 3. The manner in which the mounting assembly accomplishes these purposes is described in greater detail below.

Initially, the frame 20 is preferably formed from square tubing to form a flat surface 30 upon which the tool box 12 is mounted. Accordingly, the frame 20 accommodates containers or tool boxes of a great variety of sizes and shapes. With the tool box 12 being mounted in place upon the frame as illustrated in FIGS. 2 and 3, the tool box is attached to the frame, for example, by means of bolts such as that indicated at 32 passing through holes 34 in the frame. Although not shown in the drawings, it will be obvious that the bolts may similarly pass through openings in the tool box 12 and be secured, for example, by means of nuts (not shown).

In order to mount the frame 20 upon the bracket 18, the bracket 18 is provided with projections 36 and 38 forming aligned openings 40. Tubular pieces 42 and 44 are similarly affixed to the frame 20, for example by means of welding, and form openings 46 which can be brought into alignment with the openings 40 on the bracket 18 for receiving the pin 22 in the manner illustrated in FIGS. 2 and 3. With the frame 20 thus mounted upon the bracket 18, the tubular pieces 42 and 44 act as bearings supported upon the pin 22 and the projections 36 and 38 to facilitate pivotable movement of the frame 20 and tool box 12 between the positions illustrated in FIGS. 2 and 3.

With the pin 22 fully inserted into the openings 40 and 46, the pin is retained in place, for example, by means of a set screw 48 threaded into the upper projection 36 for engagement with a recess 50 toward the upper end of the pin 22.

In order to more positively prevent removal of the tool box 12 in frame 20 from the vehicle, the pin 22 is also provided with a radial opening 52 which extends through the pin at a location beneath the upper projection 36 when the pin 22 is fully inserted. To prevent unauthorized removal of the tool box in the frame 20, locking means such as the padlock 26 may then be passed through the radial opening 52 and locked to prevent withdrawal of the pin 22 without a key or combination for opening the padlock 26.

The locater lever 28 is pivotably attached to the frame 20 by means of a bolt 54. An end 56 of the lever 28 extends toward the bracket 18 while a handle 58 is connected to the other end of the lever to facilitate its manual operation. A locking projection 60 is secured to a base portion of the bracket 18, for example by means of welding, to form a first slot 62 adjacent the lower projection 38 and a second slot 64 adjacent a vertical plate portion 66 of the bracket 18. The bracket 18 is L-shaped and also includes a horizontal plate portion 68.

In order to attach the mounting assembly 10 to a structural portion of the truck 16, the L-shaped bracket 18 is secured both to a sidewall and floor of the truck bed by means of screws or bolts (not shown) arranged through a plurality of openings 70 in the bracket 18. With the bracket 18 secured to the truck, the frame 20 is then pivotably mounted upon the bracket 18 by means of the pin 22. After the pin 22 is fully inserted through the projections 36 and 38, the set screw 48 may be engaged with the pin 22 to prevent its working loose from the bracket 18. As noted above, the pin 22 may also be secured in place by means of the lock 26 in order to prevent unauthorized removal of the tool box 12 and frame 20.

With the tool box 12 being secured upon the frame 20 as illustrated in FIGS. 2 and 3, the frame 20 may be pivoted into either the position illustrated in FIG. 2 or the position illustrated in FIG. 3. With the tool box 12 in frame 20 in the position illustrated in FIG. 2, the lever 28 may be engaged in the first slot 62 in order to maintain the tool box in place. Similarly, with the tool box 12 and frame 20 pivoted outwardly to the position illustrated in FIG. 3, the projecting end 56 of the lever 28 may be engaged with the second slot 64 for similarly maintaining the tool box in place. The tool box 12 and frame may, of course, be released from either of these positions by merely releasing the lever 28. Thus, the tool box may be pivoted into the storage position illustrated in FIG. 2 or into the exposed position illustrated in FIG. 3. As noted above, the tool box 12 may also be readily removed from the mounting assembly 10 along with the frame 20 for portable use merely by withdrawal of the pin 22. Removal of the pin 22 would, of course, require loosening the set screw 48 and removing the lock 26 if it is in place.

Accordingly, there has been disclosed a novel mounting assembly for containers such as tool boxes. Various modifications in addition to those described above will be obvious. Accordingly, the scope of the invention is defined only by the following appended claims.

What is claimed is:

1. An assembly for mounting a container on a structural element, comprising
   a bracket adapted for attachment to the structural element, said bracket having a vertical plate portion and a horizontal plate portion,
   a frame mounted for pivotable movement on said bracket, said frame including means for supporting the container,
   pin means for securing said pivotable frame on said bracket, said pin means being removable from said bracket for releasing said frame and container from said bracket,
   locater means arranged for interaction between said frame and bracket for selectively fixing the pivotable frame in at least one position relative to said bracket,
   a projection on said vertical plate portion, and
   a locking projection on said horizontal plate portion,
   wherein said locater means comprises lever means movable into engagement with a first receiving slot between said projection and said locking projection for selectively fixing said frame in said one position and movable into engagement with a second receiving slot between said locking projection and said vertical plate portion for selectively fixing said frame in a second position relative to said bracket.

2. The assembly of claim 1 further comprising lock means being selectively operable for preventing removal of said pin means.

3. The assembly of claim 2 wherein said lock means is a padlock adapted for engagement with said pin means.

4. The assembly of claim 1 wherein said bracket and frame comprise means defining passages which are alignable for receiving said pin means.

5. The assembly of claim 4 further comprising lock means which are selectively operable for preventing removal of said pin means from said passages.

6. The assembly of claim 5 wherein said lock means is a padlock, said pin means being formed with a radial passage for receiving said padlock.

7. The assembly of claim 1 wherein said frame is formed with a flat surface for receiving containers of different sizes, said frame further being adapted for attachment to the container.

8. The assembly of claim 7 wherein said frame is formed from square tubing.

9. The assembly of claim 1 wherein the container is a tool box and the structural element is part of a vehicle, said locater means being adapted for selectively fixing said frame in said one position for storing the container on the vehicle and for selectively fixing said frame in a second position relative to said bracket for making the container readily accessible.

* * * * *